(12) United States Patent  
Kimura

(10) Patent No.: US 6,663,088 B2  
(45) Date of Patent: Dec. 16, 2003

(54) GAS SPRING AND METHOD OF CHARGING GAS INTO THE GAS SPRING

(75) Inventor: Seiji Kimura, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 09/980,178

(22) PCT Filed: May 26, 2001

(86) PCT No.: PCT/JP01/02424

§ 371 (c)(1),  
(2), (4) Date: Mar. 29, 2002

(87) PCT Pub. No.: WO01/75327

PCT Pub. Date: Oct. 11, 2001

(65) Prior Publication Data

US 2003/0155696 A1 Aug. 21, 2003

(30) Foreign Application Priority Data

Mar. 31, 2000 (JP) ............................................ 2000-99443

(51) Int. Cl.[7] .............................. F16F 9/43; F16F 9/02; B23B 31/177
(52) U.S. Cl. .......................... 267/64.28; 53/403; 141/4; 267/64.11
(58) Field of Search ................... 267/64.28, 64.11, 267/130, 119, 120, 124; 188/322.21; 141/4, 37, 98; 53/403, 489, 478, 88, 101, 319, 329.2; 184/6.14; 269/20

(56) References Cited

U.S. PATENT DOCUMENTS 5,524,871 A  *  6/1996  Muller et al. ............. 267/64.28

FOREIGN PATENT DOCUMENTS

| JP | 59-219535 | * | 12/1984 |
| JP | 60-215129 | * | 10/1985 |
| JP | 2000-5907 A | * | 1/2000 |
| WO | 98/27361 | * | 6/1998 |

* cited by examiner

*Primary Examiner*—Douglas C. Butler  
(74) *Attorney, Agent, or Firm*—Darby & Darby

(57) ABSTRACT

A gas spring and a method for filling a gas chamber of a gas spring does not require the use of a gas filling valve. Gas spring (5) includes a rod member (20), a cylinder main body (21), a gas filling chamber (22), first and second sealing members (23, 24), a plurality of pin members (25), and a plurality of slots (26). A gas filling implement (30) makes it possible to fill the gas filling chamber (22) with compressed gas in a simple and reliable manner without providing the gas spring (5) with a gas filling valve having a nonreturn valve. Consequently, the entire gas spring (5) is configured symmetrically about the axial center of the rod member (20), and its center of gravity is aligned with the axial center of the rod member (20), making it possible to prevent the gas spring (5) from inducing vibrations in the main shaft.

8 Claims, 9 Drawing Sheets

GAS SPRING AND METHOD OF CHARGING GAS INTO THE GAS SPRING

This application is a 371 of PCT/JP01/0242 filed Mar. 26, 2001.

FIELD OF THE INVENTION

The present invention relates to a gas spring and a gas filling method. More particularly, the present invention relates to an improved technique for filling a gas spring with compressed gas.

BACKGROUND OF THE INVENTION

A gas filling chamber of a conventional gas spring is filled with gas, commonly nitrogen, compressed to a high pressure of about 7–10 Mpa. A gas filling valve, equipped with a nonretum valve, allows the gas filling chamber to be filled with the compressed gas. The gas spring is filled with compressed gas through the gas filling valve during fabrication, and the compressed gas is subsequently replenished through the gas filling valve as the gas pressure decreases.

The applicant has devised and studied the feasibility of applying gas springs to situations in which a drawbar, used to fasten a tool to the main shaft of a machine tool, is driven toward to the tool fastening side. The main shaft of a contemporary machine tool is rotated at a high speed of about 30,000–40,000rpm. When a gas spring is used to fasten the tool to the main shaft of the machine tool, the gas filling valve is mounted at a position away from the center of the main shaft, so the centrifugal force acting on the gas filling valve causes the main shaft to vibrate, resulting in reduced machining accuracy.

In view of this, dispensing with the gas filling valve appears to be the preferred option, however no technique has so far been proposed that would allow the gas filling chamber of a gas spring to be filled with compressed gas without a gas filling valve mounted on the gas spring.

OBJECTS AND SUMMARY OF THE INVENTION

It is an object of the present invention to provide a gas spring which overcomes the foregoing problems.

More specifically, it is an object of the present invention to provide a gas spring, without a gas filling valve.

It is another objection of the present invention to provide a method in which the gas filling chamber of a gas spring can be filled with compressed gas without the use of a gas filling valve.

Briefly stated, the present invention provides a gas spring and a method for filling a gas chamber of a gas spring which does not require the use of a gas filling valve. A gas spring includes a rod member, a cylinder main body, a gas filling chamber, first and second sealing members, a plurality of pin members, and a plurality of slots. A gas filling implement makes it possible to fill the gas filling chamber with compressed gas in a simple and reliable manner without providing the gas spring with a gas filling valve having a nonreturn valve. Consequently, the entire gas spring is configured symmetrically about the axial center of the rod member, and its center of gravity is aligned with the axial center of the rod member, making it possible to prevent the gas spring from inducing vibrations in the main shaft.

The gas spring of the present invention comprises a cylindrical rod member with a piston, a cylinder main body fitted over the rod member, and an annular gas filling chamber filled with compressed gas and disposed between the rod member and the cylinder main body. This gas spring further comprises a first sealing member fitted over the piston portion of the rod member at one end of the gas filling chamber. A second sealing member is fitted into the cylinder main body at the other end of the gas filling chamber. A plurality of pin members are disposed in an axially symmetrical fashion about the rod member. A plurality of slots are provided to the cylinder main body to allow individual mating with the plurality of pin members and to restrict the range of movement of the rod member in relation to the cylinder main body. Thus, the cylinder main body is moved axially in relation to the rod member while the second sealing member is prevented from separating from the rod member in a state in which the pin members are not yet mounted. The gas filling chamber is filled with compressed gas through the slots. The cylinder main body is then moved back and the pin members are locked in place.

When the pin members are mounted, they mate with the slots formed in the cylinder main body, and the rod member is restricted in its ability to move relative to the cylinder main body. When the movement range is restricted in this manner, the gap between the rod member and the cylinder main body at the two ends of the gas filling chamber is sealed by the first and second sealing members, and the gas filling chamber is kept in an airtight state. Consequently, the pressure of the compressed gas in the gas filling chamber acts on the piston portion to create a situation in which the rod member is urged to move relative to the cylinder main body.

For example, the gas spring can be used as a drive mechanism for urging a drawbar on the main shaft of a machine tool toward a tool fastening side in order to fasten the tool on the main shaft. In this case, using a hollow rod member is preferred in order to allow the drawbar to be inserted into the rod member. It is apparent, however, that this concept can also be adapted to a variety of other devices or mechanisms required to perform drive functions.

The pin members are removed when the gas filling chamber is being filled with compressed gas. The pin members are disengaged without being mounted from the slots formed in the cylinder main body, thus removing restrictions on the range of movement of the rod member in relation to the cylinder main body. It is possible at this point to fill the gas filling chamber with compressed gas through the slots as the cylinder main body is axially moved relative to the rod member while the second sealing member is prevented from separating from the rod member (for example, in a state in which at least some of the slots are positioned on the external periphery near one end of the gas filling chamber). The cylinder main body is then returned to its original position, the gas filling chamber is rendered airtight, the compressed gas in the gas filling chamber is sealed, and the pin members are locked in place by being mated with individual slots, completing the introduction of the compressed gas.

Using the gas spring in accordance with the above-described routine allows the gas filling chamber to be filled with compressed gas in a simple and accurate manner. This makes it possible to dispense with the gas filling valve and allows the pin members, as well as the slots or other elements in engagement with these pin members, to be arranged symmetrically about the axial center of the rod members. It is therefore possible to configure the entire gas spring as a structure symmetrical about the axial center of the rod member and to align its center of gravity with the axial center of the rod member, allowing any reduction in machining accuracy to be securely prevented because the gas spring is prevented from creating vibration even when a main shaft rotates at a high speed in cases in which, for example, the gas spring is used as a drive mechanism for urging a drawbar on the main shaft of a machine tool toward the tool fastening side in order to fasten a tool to the main shaft.

According to a feature of the present invention, a gas spring comprises a cylindrical rod member with a piston, a cylinder main body fitted over the rod member, and an annular gas filling chamber filled with compressed gas and disposed between the rod member and the cylinder main body. This gas spring further comprises a first sealing member fitted over the rod member at one end of the gas filling chamber. A second sealing member is fitted into the cylinder main body at the other end of the gas filling chamber. A stopper member is fitted internally and threadably engaged with the cylinder main body and slidably fitted over the rod member on the opposite side from the gas filling chamber in relation to the piston portion of the rod member. Thus, the rod member is moved axially in relation to the cylinder main body while the first sealing member is prevented from reaching the threaded hole for the stopper member of the cylinder main body in a state in which the stopper member is not yet mounted. The gas filling chamber is then filled with compressed gas through a rod insertion hole facing the second sealing member. The rod member is then moved back, and the stopper member is mounted.

When mounted, the stopper member is slidably fitted over the rod member on the opposite side from the gas filling chamber in relation to the piston portion of the rod member. The stopper member is internally fitted and threadably engaged with the cylinder main body. The range of movement of the rod member in relation to the cylinder main body is thereby restricted by the stopper member. When the movement range is restricted in this manner, the gap between the rod member and the cylinder main body at the two ends of the gas filling chamber is sealed by the first and second sealing members, and the gas filling chamber is kept in an airtight state. Consequently, the pressure of the compressed gas in the gas filling chamber acts on the piston portion and creates a situation in which the rod member is urged to move relative to the cylinder main body.

The stopper member is removed when the gas filling chamber is being filled with compressed gas. When the stopper member is not mounted, there are no restrictions on the range of movement of the rod member in relation to the cylinder main body. It is possible at this point to fill the gas filling chamber with compressed gas through the rod insertion hole facing the second sealing member in a state in which the rod member is axially moved relative to the cylinder main body while the first sealing member is prevented from reaching the threaded hole for the stopper member of the cylinder main body (for example, in a state in which the rod member is removed from the rod insertion hole facing the second sealing member). The rod member is then returned to its original position, the gas filling chamber is rendered airtight, the compressed gas in the gas filling chamber is sealed, and the sealing member is then mounted, completing the introduction of the compressed gas.

Using the gas spring in accordance with the above-described routine allows the gas filling chamber to be filled with compressed gas in a simple and accurate manner. This makes it possible to dispense with the gas filling valve, to configure the entire gas spring as a structure symmetrical about the axial center of the rod member, and to align its center of gravity with the axial center of the rod member. Consequently, vibration sources are removed and any reduction in machining accuracy is securely prevented, even when the spring is mounted on the main shaft of a machine tool and the main shaft rotates at a high speed.

The present invention also provides a gas filling method for introducing compressed gas into a gas spring comprising a cylindrical rod member with a piston, a cylinder main body fitted over the rod member, an annular gas filling chamber filled with compressed gas and disposed between the rod member and the cylinder main body, a first sealing member fitted over the piston portion of the rod member at one end of the gas filling chamber, a second sealing member fitted into the cylinder main body at the other end of the gas filling chamber, a plurality of pin members disposed in an axially symmetrical fashion about the rod member, and a plurality of slots provided to the cylinder main body to allow individual mating with the plurality of pin members and to restrict the range of movement of the rod member in relation to the cylinder main body. This gas filling method is characterized in that the gas spring is placed in a special gas filling implement in a state in which the pin members are not yet mounted. The cylinder main body is moved axially in relation to the rod member while the second sealing member is prevented from separating from the rod member. The gas filling chamber is filled with compressed gas through the gas filling implement and the slots. The cylinder main body is then moved back, and the pin members are locked in place.

When the gas filling chamber is to be filled with compressed gas, the gas spring is placed in a gas filling implement, and the pin members are removed. The pin members are disengaged without being mounted from the slots formed in the cylinder main body, thus removing restrictions on the range of movement of the rod member in relation to the cylinder main body. In this state, the cylinder main body is moved axially in relation to the rod member, while the second sealing member is prevented from separating from the rod member. The gas filling chamber is filled with compressed gas through the gas filling implement and the slots.

The cylinder main body is then returned to its original position, the gas filling chamber is rendered airtight, the compressed gas in the gas filling chamber is sealed, the pin members are locked in place, and the gas spring is removed from the gas filling implement, completing the introduction of the compressed gas. Specifically, filling the gas spring with gas in the this manner allows the gas filling chamber to be filled with compressed gas in a simple and accurate manner without the use of a gas filling valve. It is therefore possible to configure the entire gas spring as a structure symmetrical about the axial center of the rod member and to align its center of gravity with the axial center of the rod member when the gas spring is filled with compressed gas in accordance with the proposed gas filling method. A gas filling valve equipped with a nonreturn valve can be mounted on the gas filling implement, and the gas filling chamber can be filled with compressed gas through the gas filling valve.

The special gas filling implement has an inner cylinder airtightly fittable over the slot-free portion of the cylinder main body, an outer cylinder configured to extend all the way to one end the inner cylinder and to slidably fit over the inner cylinder in an airtight fashion, a blocking member configured to block one end of the rod member and to airtightly fit into the end portion of the outer cylinder, an axial hole blocking member airtightly inserted into the axial hole of the rod member on the opposite side from the blocking member, and a compressed gas filling conduit formed in the axial hole blocking member.

When the gas filling chamber is to be filled with compressed gas, the gas spring is placed in the gas filling implement, and the area defined by the inner cylinder, outer cylinder, and blocking member outside the rod member is made into a sealed space. The cylinder main body is moved axially in relation to the rod member while the second sealing member is prevented from separating from the rod member in a state in which the pin members are not mounted, allowing the compressed gas introduced into the sealed space through the axial hole of the rod member to be further guided into the gas filling chamber through the slots in a reliable manner. The threaded hole for the pin member formed in the rod member can be used as a gas conduit that leads from the axial hole of the rod member to the sealed space.

The present invention provides another gas filling method for introducing compressed gas into a gas spring comprising a cylindrical rod member with a piston, a cylinder main body fitted over the rod member, an annular gas filling chamber filled with compressed gas and disposed between the rod member and the cylinder main body, a first sealing member fitted over the rod member at one end of the gas filling chamber, a second sealing member fitted into the cylinder main body at the other end of the gas filling chamber, and a stopper member internally fitted and threadably engaged with the cylinder main body and slidably fitted over the rod member on the opposite side from the gas filling chamber in relation to the piston portion of the rod member. This gas filling method for a gas spring is characterized in that the gas spring is placed in a special gas filling implement in a state in which the stopper member is not yet mounted. The rod member is moved axially in relation to the cylinder main body while the first sealing member is prevented from reaching the threaded hole for the stopper member of the cylinder main body. The gas filling chamber is filled with compressed gas through the gas filling implement and a rod insertion hole facing the second sealing member. The rod member is then moved back, and the stopper member is mounted.

When the gas filling chamber is to be filled with compressed gas, the gas spring is placed in a gas filling implement, and the stopper member is removed. When the stopper member is not mounted, the rod member is not restricted in terms of the range within which the member can move in relation to the cylinder main body. The rod member is moved axially in relation to the cylinder main body while the first sealing member is prevented from reaching the threaded hole for the stopper member of the cylinder main body in this state, and the gas filling chamber is filled with compressed gas through the gas filling implement and a rod insertion hole facing the second sealing member.

The rod member is then returned to its original position, the gas filling chamber is rendered airtight, the compressed gas in the gas filling chamber is sealed, the stopper member is mounted, and the gas spring is removed from the gas filling implement, completing the introduction of the compressed gas. Specifically, filling the gas spring with gas in accordance with this method allows the gas filling chamber to be filled with compressed gas in a simple and accurate manner without the use of a gas filling valve. It is therefore possible to configure the entire gas spring as a structure symmetrical about the axial center of the rod member and to align its center of gravity with the axial center of the rod member when the gas spring is filled with compressed gas in accordance with the proposed gas filling method. A gas filling valve equipped with a nonreturn valve can be mounted on the gas filling implement, and the gas filling chamber can be filled with compressed gas through the gas filling valve.

The special gas filling implement includes a casing member, having an opening on one side of the stopper member and possessing a housing chamber in which the gas spring can be airtightly accommodated while the rod member is moved axially in relation to the cylinder main body; a blocking member, fitted into the opening in an airtight and slidable manner, designed to be able to come into contact with the rod member; a pull rod, inserted into the axial center of the gas spring, designed such that one end thereof is immovably mounted on the blocking member, and the other end thereof is airtightly inserted into the casing member; and a gas filling conduit, formed in the casing member, used to fill the housing chamber with compressed gas.

The housing chamber containing the gas spring is rendered airtight in a state in which the gas spring is placed in the gas filling implement. It is possible to adopt an arrangement in which the rod member moves axially in relation to the cylinder main body by the pull rod while the first sealing member is prevented from reaching the threaded hole for the stopper member of the cylinder main body. The gas filling chamber is filled with compressed gas, and the rod member is accurately returned to its original position together with the blocking member by the pulling of the pull rod following the introduction of compressed gas.

The above, and other objects, features and advantages of the present invention will become apparent from the following description read in conjunction with the accompanying drawings, in which like reference numerals designate the same elements.

DETAILED DESCRIPTION OF THE INVENTION

While not limiting the scope of the present invention, specific embodiments of the present invention will now be described.

According to one embodiment, the present invention is adapted for us with a tool fastener whereby a tool is removably fastened to the tip of a main shaft in a machine tool.

Figure 1:
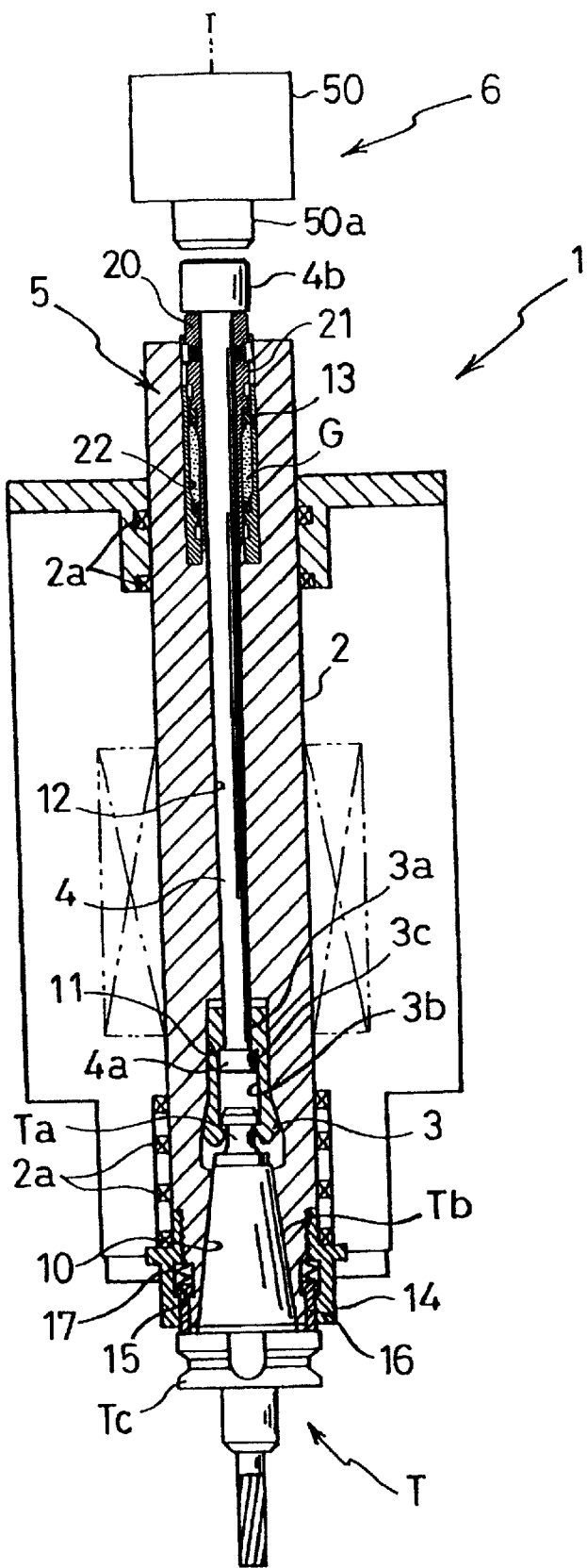
FIG. 1 is a longitudinal section drawing of a main shaft and a tool fastener, with the tool fastened, having a gas spring for a machine tool in accordance with an embodiment of the present invention.

Referring to FIG. 1, a main shaft 2 of a machine tool is rotatably supported by a plurality of bearings 2a. The tip of main shaft 2 is provided with a tapered tool holder 10, flared toward the tip.

A tool fastener 1 includes a collet 3 for releasably engaging a mating portion Ta in the base end of a tool T. A drawbar 4 is linked to collet 3. A gas spring 5 allows drawbar 4 to urge the tool fastening side (base-end side of main shaft 2). A release mechanism 6 drives drawbar 4 toward the release side (tip side of main shaft 2) against the urging force of gas spring 5.

Tool holder 10, a container hole 11 for accommodating collet 3, a through hole 12 for passing drawbar 4, and a cylinder mounting hole 13 are arranged in a straight line from the tip to the base-end side of main shaft 2. The tip of main shaft 2 is fixed in place by threadably fitting the base end portion thereof into a sleeve 14. The space between main shaft 2 and the tip portion of sleeve 14 is provided with a plurality of holes 15 such that the base end of a pressure member 16 (whose tip is extended toward the tip of main shaft 2) is slidably fitted inside each hole 15. Pressure member 16 is urged toward the tip by a plurality of leaf springs 17 mounted in the holes 15.

The tip of collet 3 is composed of three or four separate elastic segments. Collet 3 has an axial hole 3a, for passing drawbar 4, and a large hole 3b, whose diameter is greater than that of axial hole 3a, provided to the tip side of axial hole 3a. A lock 4a, mounted on the tip of drawbar 4, is fitted into large hole 3b. Tool T includes a mating portion Ta, a tapered axial portion Tb, and a wide disk Tc provided to the tip side of tapered axial portion Tb.

Moving drawbar 4 to the tool fastening side causes lock 4a to latch onto a ledge 3c at the border between axial hole 3a and large hole 3b. When this happens, the tip of collet 3 is retracted into container hole 11 while the segments are shut together. In the process, the tip is caused to engage mating portion Ta of tool T. Mating portion Ta is then drawn toward the base end, and tool T is fastened such that tapered axial portion Tb thereof is pressed against tool holder 10.

Fastening tool T by tapered axial portion Tb results in a situation in which disk Tc of tool T is urged toward the tip side by pressure member 16, itself urged by leaf springs 17. When drawbar 4 moves to the engagement release side, the engagement of lock 4a with ledge 3c is released, tool T is pushed toward the tip side by pressure member 16, and engagement is released. In addition, the engagement between collet 3 and mating portion Ta of tool T is released and tool T is freed because the arrangement moves toward the tip while the elastic segments on the tip side of collet 3 spread open.

Specifically, drawbar 4 is driven from an engagement release position to a tool fastening position as a result of the fact that drawbar 4 is urged to the tool fastening side (base-end side of main shaft 2) by gas spring 5 through the agency of a mating axial portion 4b immovably mounted on the base end, allowing drawbar 4 to be held in the tool fastening position and tool T to be fastened to tool holder 10. Release mechanism 6 has a hydraulic cylinder 50, which is controllably driven by a drive controller containing a hydraulic supply source. Mating axial portion 4b of drawbar 4 is pushed by the tip of a piston rod 50a, thereby driving rod member 20 of gas spring 5 from an extended position to a retracted position, moving drawbar 4 to the engagement release side.

Figure 2:
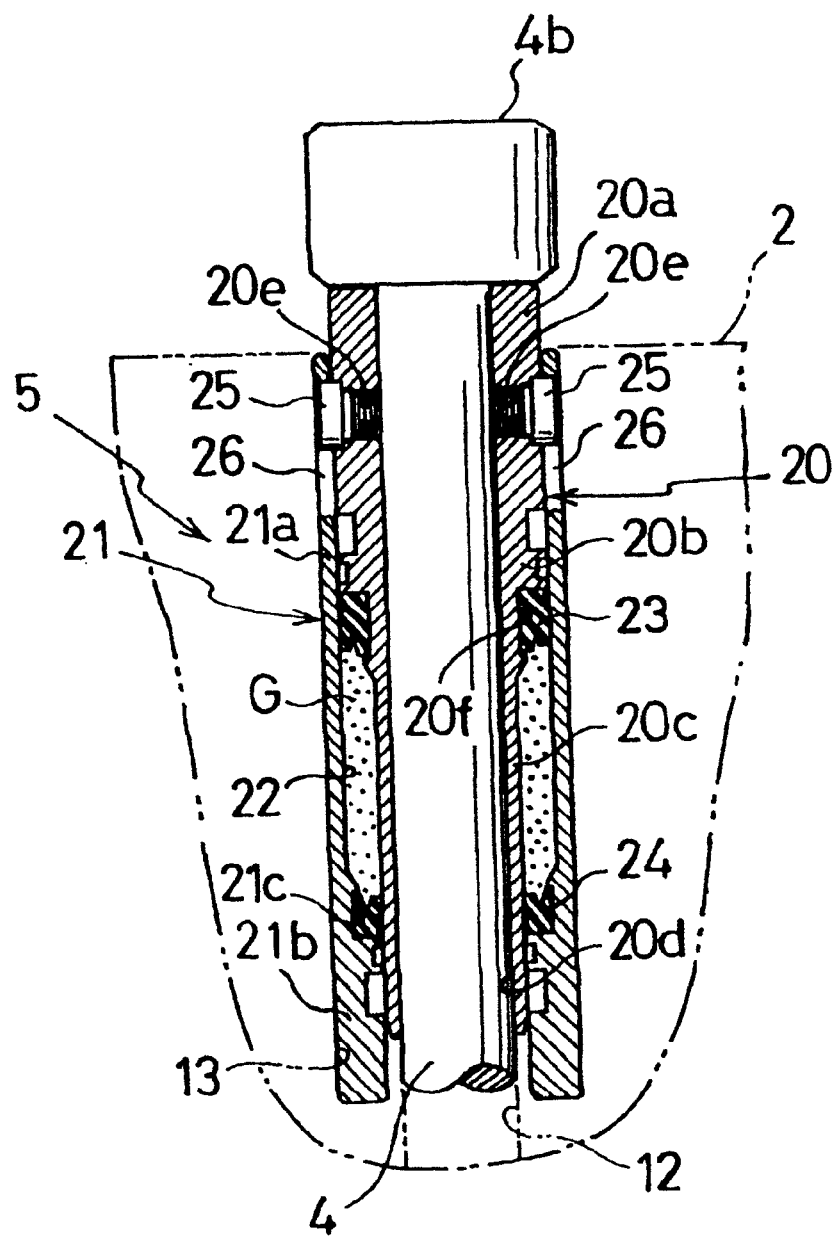
FIG. 2 is a longitudinal section drawing of the gas spring and drawbar in a tool fastening position.
Figure 3:
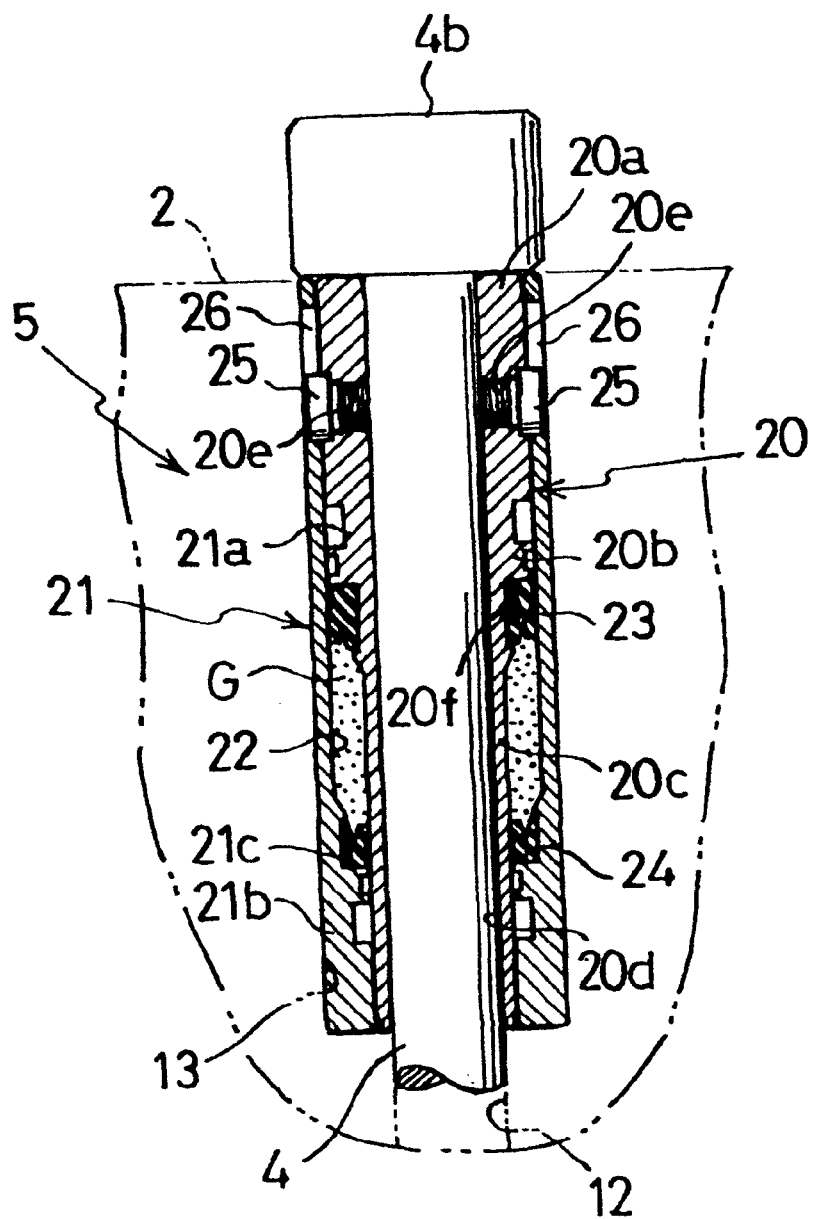
FIG. 3 is a longitudinal section drawing of the gas spring and drawbar in a tool release position.

Referring now to FIGS. 2 and 3, gas spring 5 will be described in detail. For the sake of convenience, the top, bottom, left, and right sides referred to in the description will correspond to the top, bottom, left, and right sides in FIGS. 2–5.

Gas spring 5 includes cylindrical rod member 20 with a piston. A cylinder main body 21 is fitted over rod member 20. An annular gas filling chamber 22, filled with compressed gas G, is disposed between rod member 20 and cylinder main body 21. A first sealing member 23 is fitted over piston portion 20b of rod member 20, above gas filling chamber 22. A second sealing member 24 is fitted into cylinder main body 21 below gas filling chamber 22. A plurality (for example, two) of pin members 25 are disposed in an axially symmetrical fashion about rod member 20. A plurality (for example, two) of slots 26 are provided to cylinder main body 21 to allow individual mating with the plurality of pin members 25. Slots 26 also restrict movement of rod member 20 relative to cylinder main body 21 to a prescribed range.

Rod member 20 is configured such that an output portion 20a, piston portion 20b, and a bottom cylinder 20c are integrally formed in a serial arrangement in the direction from the top end downward. Drawbar 4 is slidably inserted into an axial hole 20d. The outside diameter and wall thickness of piston portion 20b is the same as those of output portion 20a and greater than those of bottom cylinder 20c.

A plurality (for example, two) of radially extended penetrating threaded holes 20e, that are symmetrical about the axis of rod member 20, are formed near the bottom end of output portion 20a. Pin members 25 are detachably screwed into threaded holes 20e from the outside. An annular recess 20f is formed around the outside of the piston portion 20b at the bottom end thereof. First annular sealing member 23 is secured in annular recess 20f.

Cylinder main body 21, whose vertical length is about the same as that of rod member 20, is configured as a monolithic structure composed of an upwardly disposed thin-walled cylinder 21a, whose length is about 5/7 of the total length of cylinder main body 21, and a downwardly disposed thick-walled cylinder 21b, whose length is about 2/7 of the total length of cylinder main body 21. Thin-walled cylinder 21a is slidably fitted over piston portion 20b and output portion 20a of rod member 20. Thick-walled cylinder 21b is slidably fitted over bottom cylinder 20c of rod member 20.

A plurality of vertically oriented slots 26 are provided to the top portion of thin-walled cylinder 21a. Annular recess 21c is formed around the inside of thick-walled cylinder 21b at its top end. A second annular sealing member 24 is secured in annular recess 21c. Cylinder main body 21 is detachably fastened by being fitted into cylinder mounting hole 13 formed in the main shaft 2.

When pin members 25 mate with the top ends of slots 26, rod member 20 assumes an extended position in which output portion 20a is extended all the way above cylinder main body 21. In this position, drawbar 4 assumes a tool fastening position, as shown in FIG. 2. When pin members 25 mate with the bottom ends of slots 26, rod member 20 assumes a retracted position in which the entire output portion 20a is retracted into cylinder main body 21. In this position, drawbar 4 assumes an engagement release position, as shown in FIG. 3.

The movement of rod member 20 in relation to cylinder main body 21 is thus limited to the range between the extended position and retracted position when a plurality of pin members 25 are mounted. The space between rod member 20 and cylinder main body 21 at the top and bottom of gas filling chamber 22 is sealed by the first and second sealing members 23 and 24. Thus, gas filling chamber 22 is kept in an airtight state when rod member 20 moves up and down within this range. Consequently, the pressure of compressed gas G in gas filling chamber 22 acts on piston portion 20b to create a situation in which rod member 20 is urged upward relative to cylinder main body 21.

Referring now to FIGS. 2 through 5, the following is a description of a method whereby gas spring 5 is filled with compressed gas G. A gas filling implement 30, used during gas filling, will first be described.

Gas filling implement 30 includes an inner cylinder 31, airtightly fittable over the portion of cylinder main body 21 underneath slots 26. An outer cylinder 32 extends above inner cylinder 31 and slidably fits over inner cylinder 31 in an airtight fashion. A blocking member 33 blocks the top-end side of rod member 20 and airtightly fits into the top end of outer cylinder 32. An axial hole blocking member 34 is airtightly inserted into axial hole 20d of rod member 20 on the opposite side from blocking member 33. A compressed gas filling conduit 35 is formed in axial hole blocking member 34. A check valve 36 is incorporated into compressed gas filling conduit 35 of axial hole blocking member 34.

A sealing member 40, fitted into the bottom end of inner cylinder 31, a sealing member 41, fitted over the top end of inner cylinder 31, a sealing member 42, fitted over blocking member 33, and a sealing member 43, fitted over the top end of axial hole blocking member 34, are provided in order to maintain airtightness among the members 31–34.

Figure 4:
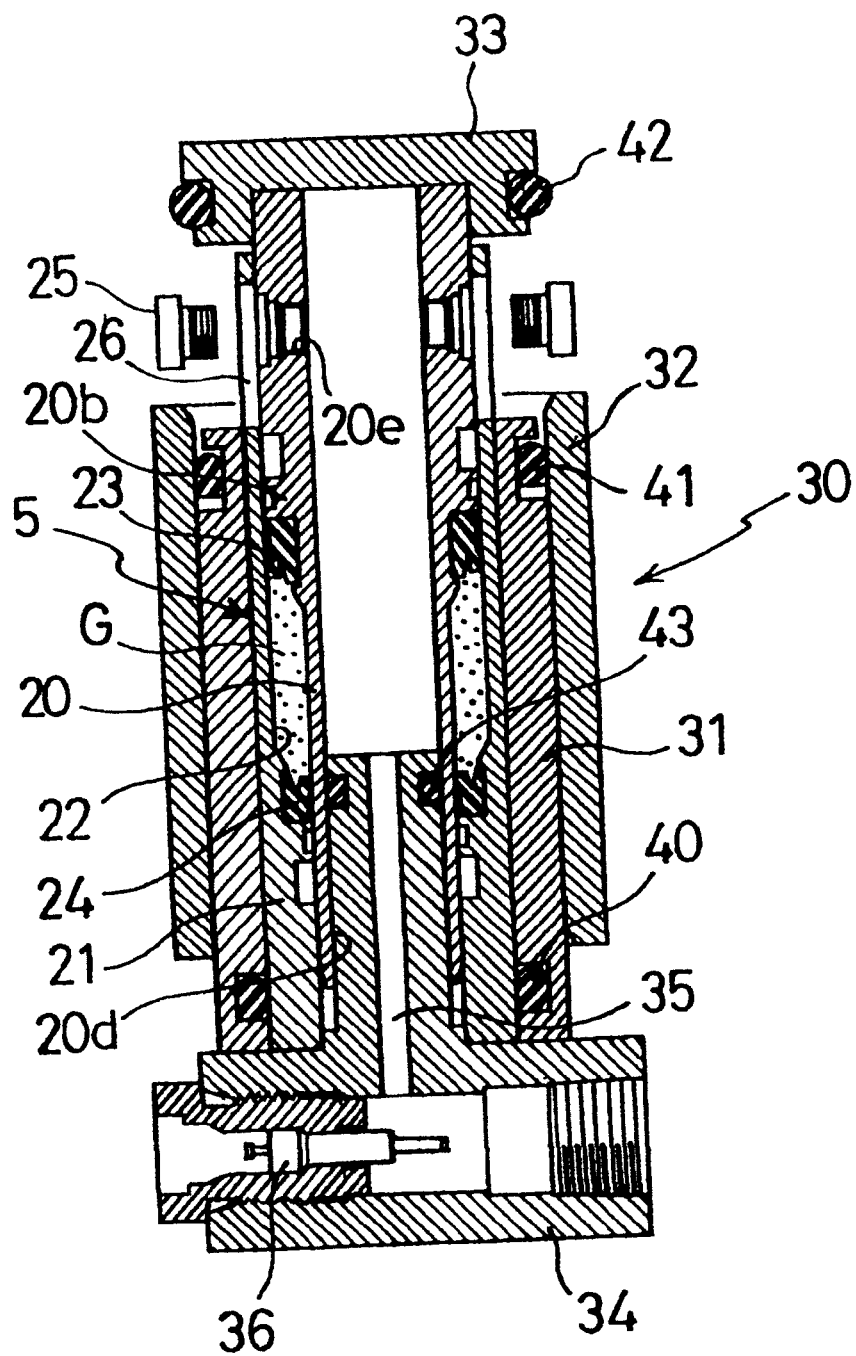
FIG. 4 is a longitudinal section drawing of a gas filling implement and the gas spring before compressed gas is introduced.

When gas filling chamber 22 of gas spring 5 is to be filled with compressed gas G by employing gas filling implement 30, gas spring 5 is placed into gas filling implement 30 in the manner shown in FIG. 4. Blocking member 33 is fitted over the top end of outer cylinder 32 (see FIG. 5), whereupon outer cylinder 32 is slid downward, the exterior of the tip portion of rod member 20 is exposed, and pin members 25 are removed.

Figure 5:
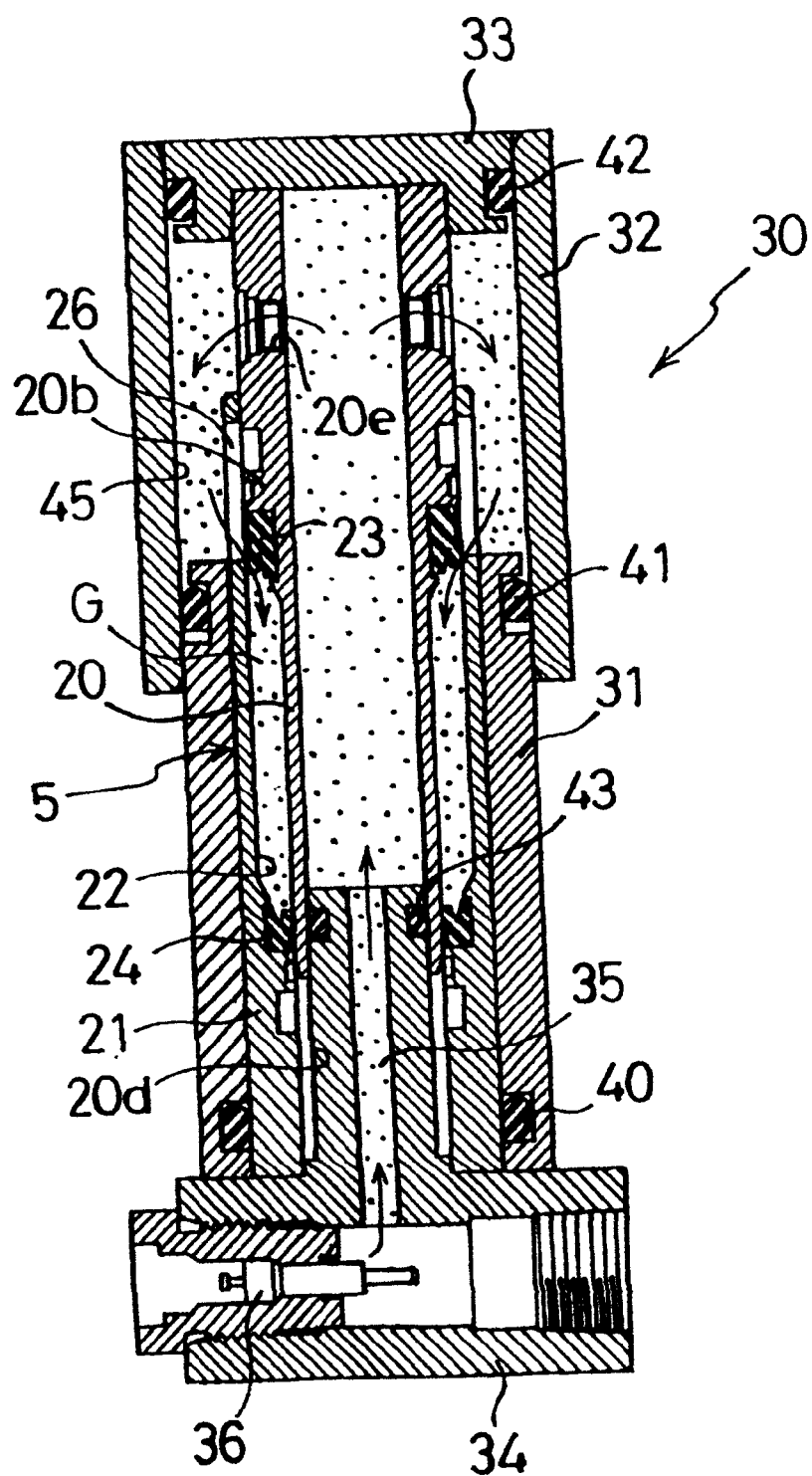
FIG. 5 is a longitudinal section drawing of the gas filling implement and gas spring during introduction of compressed gas.

When pin members 25 are removed, the range within which rod member 20 can move relative to cylinder main body 21 is not restricted any longer because pin members 25 are disengaged from slots 26 in cylinder main body 21. Outer cylinder 32 is subsequently slid upward and fitted over blocking member 33 to form an airtight space 45 bounded by inner cylinder 31, outer cylinder 32, and blocking member 33 outside rod member 20. Rod member 20 is moved together, with outer cylinder 32 and blocking member 33, axially upward with respect to cylinder main body 21, as shown in FIG. 5. Gas spring 5 may be placed in gas filling implement 30 after pin members 25 have been removed. At this time, it is possible to move rod member 20 upward over a distance at which second sealing member 24 remains attached to rod member 20, to align the bottom ends of slots 26 at least with the external peripheral side near the top end of gas filling chamber 22, and to fill gas filling chamber. 22 with compressed gas G through slots 26.

Specifically, compressed gas G, introduced through check valve 36 from a gas cylinder or the like in the state shown in FIG. 5, is passed through compressed gas filling conduit 35 into axial hole 20d of rod member 20 (as shown by the arrows in FIG. 5), guided from axial hole 20d into airtight space 45 through threaded holes 20e, and admitted from airtight space 45 into gas filling chamber 22 via slots 26. Compressed gas G can also be admitted into gas filling chamber 22 by the elastic deformation of first sealing member 23 in the absence of slots 26 underneath first sealing member 23.

Rod member 20 is subsequently moved (together with outer cylinder 32 and blocking member 33) downward to its initial position in relation to cylinder main body 21 by an air cylinder, hydraulic cylinder, or other drive means. Gas filling chamber 22 is rendered airtight. Compressed gas G, in gas filling chamber 22, is sealed. Outer cylinder 32 is subsequently slid downward in the manner shown in FIG. 4. The exterior of the top portion of rod member 20 is exposed. The assembly is locked in place in this state such that pin members 25 mate with the corresponding slots 26. Gas spring 5 is then removed from gas filling implement 30, completing the introduction of compressed gas G.

Gas filling chamber 22 of gas spring 5 can thus be filled with compressed gas G in a simple and reliable manner by the use of gas filling implement 30, even when gas spring 5 lacks the commonly mounted gas filling valve. In other words, using gas spring 5 makes it possible to dispense with the gas filling valve and to symmetrically arrange a plurality of pin members 25, a plurality of slots 26, a plurality of threaded holes 20e, and the like about the axial center of rod member 20.

Consequently, the entire gas spring 5 is configured symmetrically about the axial center of rod member 20, its center of gravity being aligned with the axial center of rod member 20. Gas spring 5, which is mounted on a rotating main shaft 2, is prevented from causing vibration, making it possible to securely prevent machining accuracy from decreasing when main shaft 2 rotates at a high speed.

Another embodiment will now be described. The top, bottom, left, and right sides referred to in the description will correspond to the top, bottom, left, and right sides in FIGS. 6–9.

Figure 6:
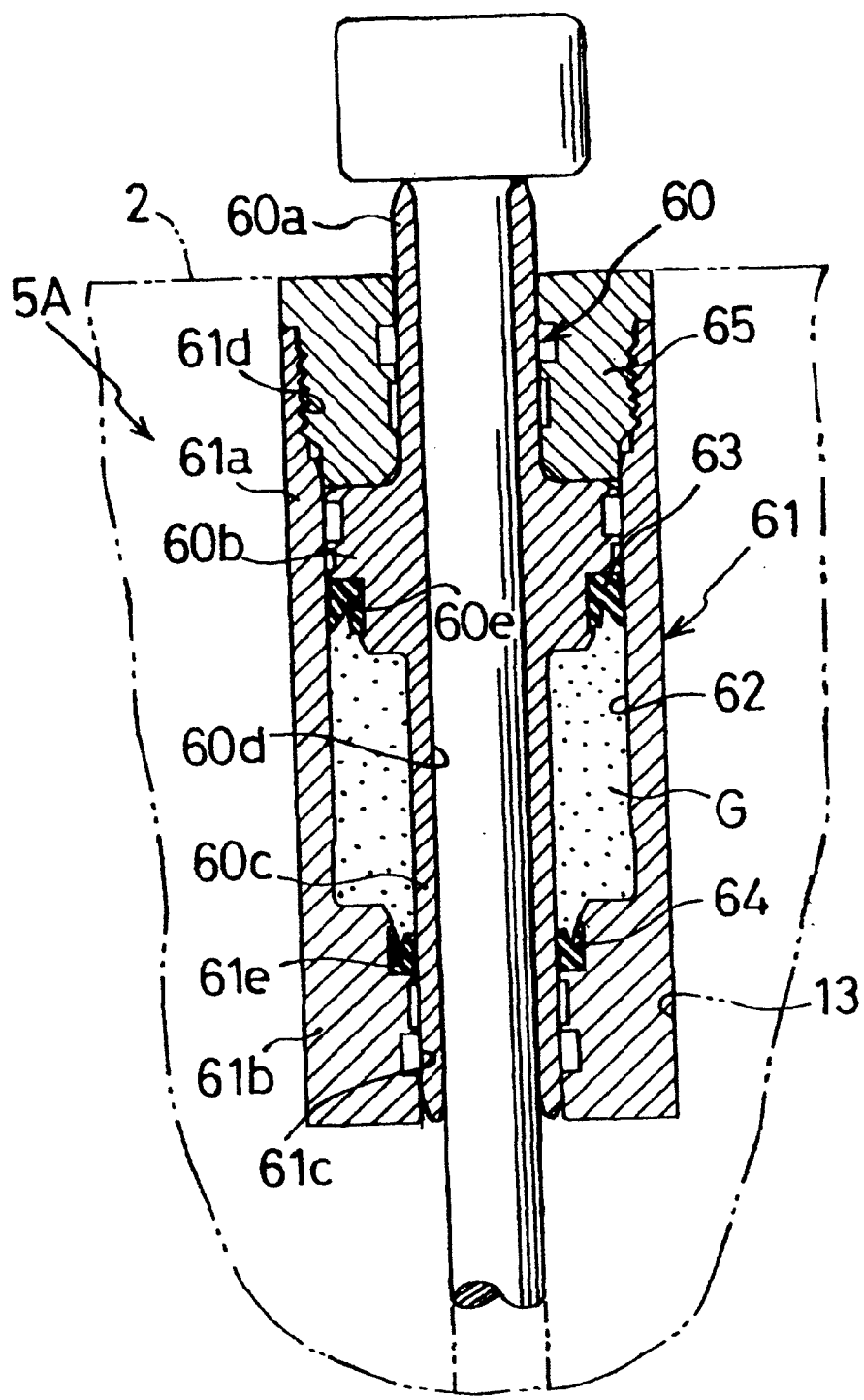
FIG. 6 is a longitudinal section drawing of a gas spring and drawbar, in a tool fastening position, pertaining to another embodiment of the present invention.
Figure 7:
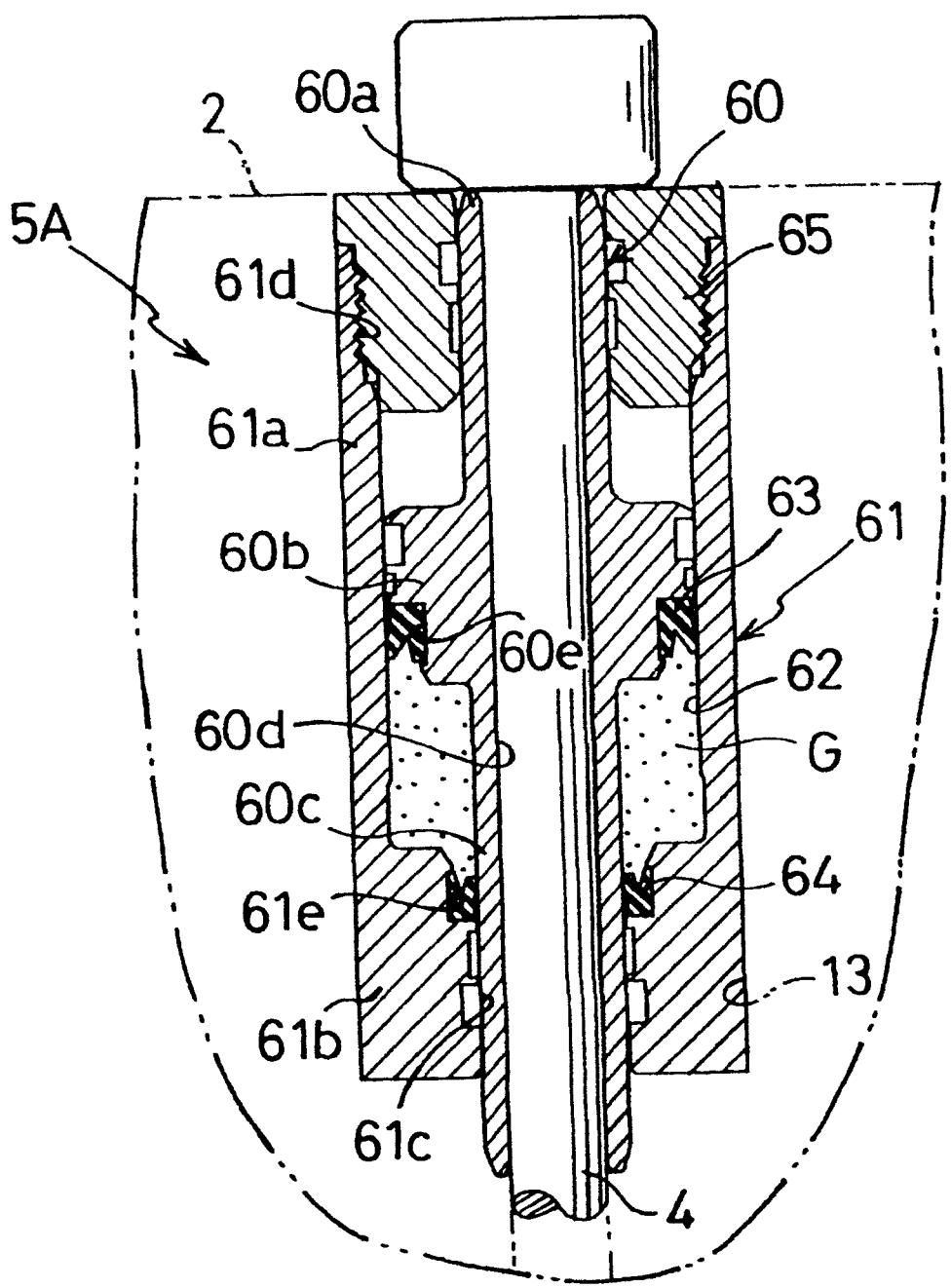
FIG. 7 is a longitudinal section drawing of the gas spring and drawbar in a tool release position.

Referring to FIGS. 6 and 7, gas spring 5A of this embodiment includes a cylindrical rod member 60 with a piston. A cylinder main body 61 is fitted over rod member 60. An annular gas filling chamber 62, filled with compressed gas G, is disposed between rod member 60 and cylinder main body 61. A first sealing member 63 is fitted over rod member 60 above gas filling chamber 62. A second sealing member 64 is fitted into cylinder main body 61 below gas filling chamber 62. A stopper member 65, internally fitted and threadably engaged with cylinder main body 61, is slidably fitted over rod member 60 on the opposite side from gas filling chamber 62 in relation to piston portion 60b of rod member 60.

Rod member 60 has an output portion 60a, a piston portion 60b, and a bottom cylinder 60c are integrally formed in a serial arrangement in the direction from the top end downward. Drawbar 4 is slidably inserted into an axial hole 60d. An annular recess 60e is formed around the outside of piston portion 60b at the bottom end thereof. A first annular sealing member 63 is secured in annular recess 60e.

Cylinder main body 61, whose vertical length is slightly less than that of rod member 60, is configured as a monolithic structure composed of an upwardly disposed thin-walled cylinder 61a. The length of thin-walled cylinder 61a is about ⅔ of the total length of cylinder main body 61. A downwardly disposed thick-walled cylinder 61b has a length of about ⅓ of the total length of cylinder main body 61. Thin-walled cylinder 61a is slidably fitted over piston portion 60b of rod member 60. Bottom cylinder 60c of rod member 60 is slidably inserted into rod insertion hole 61c (rod insertion hole 61c facing the second sealing member) inside thick-walled cylinder 61b.

A threaded hole 61d (threaded hole 61d for the stopper member) is provided to the top-end portion of thin-walled cylinder 61a. Stopper member 65 is detachably screwed into threaded hole 61d from the top. An annular recess 61e is formed around the inside of thick-walled cylinder 61b at the top end thereof. A second annular sealing member 64 is secured in annular recess 61e. Cylinder main body 61 is detachably fastened by being fitted into a cylinder mounting hole 13 formed in main shaft 2.

When stopper member 65 presses against piston portion 60b, rod member 60 assumes an extended position in which output portion 60a extends all the way above cylinder main body 61. In this state, drawbar 4 assumes a tool fastening position, as shown in FIG. 6. When the entire output portion 60a is retracted into cylinder main body 61, rod member 60 assumes a retracted position, and drawbar 4 assumes an engagement release position, as shown in FIG. 7. Rod member 60 can move further down from the retracted position in FIG. 7, but release mechanism 6 prevents any downward movement from the retracted position.

The movement of rod member 60 in relation to cylinder main body 61 is thus limited to the range between the extended position and the retracted position when stopper member 65 is mounted. The space between rod member 60 and cylinder main body 61 at the top and bottom of gas filling chamber 62 is sealed by first and second sealing members 63 and 64. Gas filling chamber 62 is kept in an airtight state when rod member 60 moves up and down within this range. Consequently, the pressure of compressed gas G in gas filling chamber 62 acts on piston portion 60b to create a situation in which rod member 60 is urged upward relative to cylinder main body 61.

Figure 8:
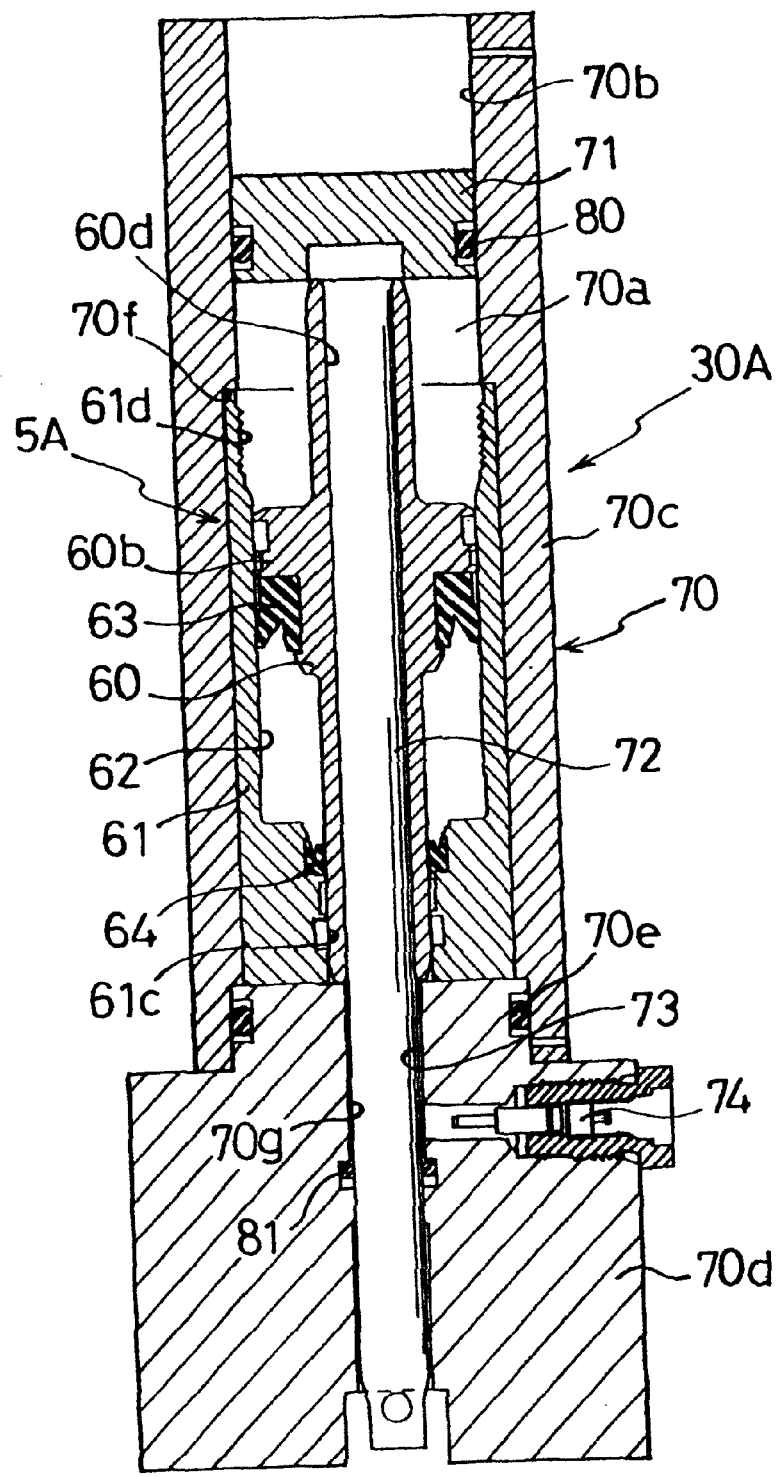
FIG. 8 is a longitudinal section drawing of a gas filling implement and the gas spring before compressed gas is introduced.
Figure 9:
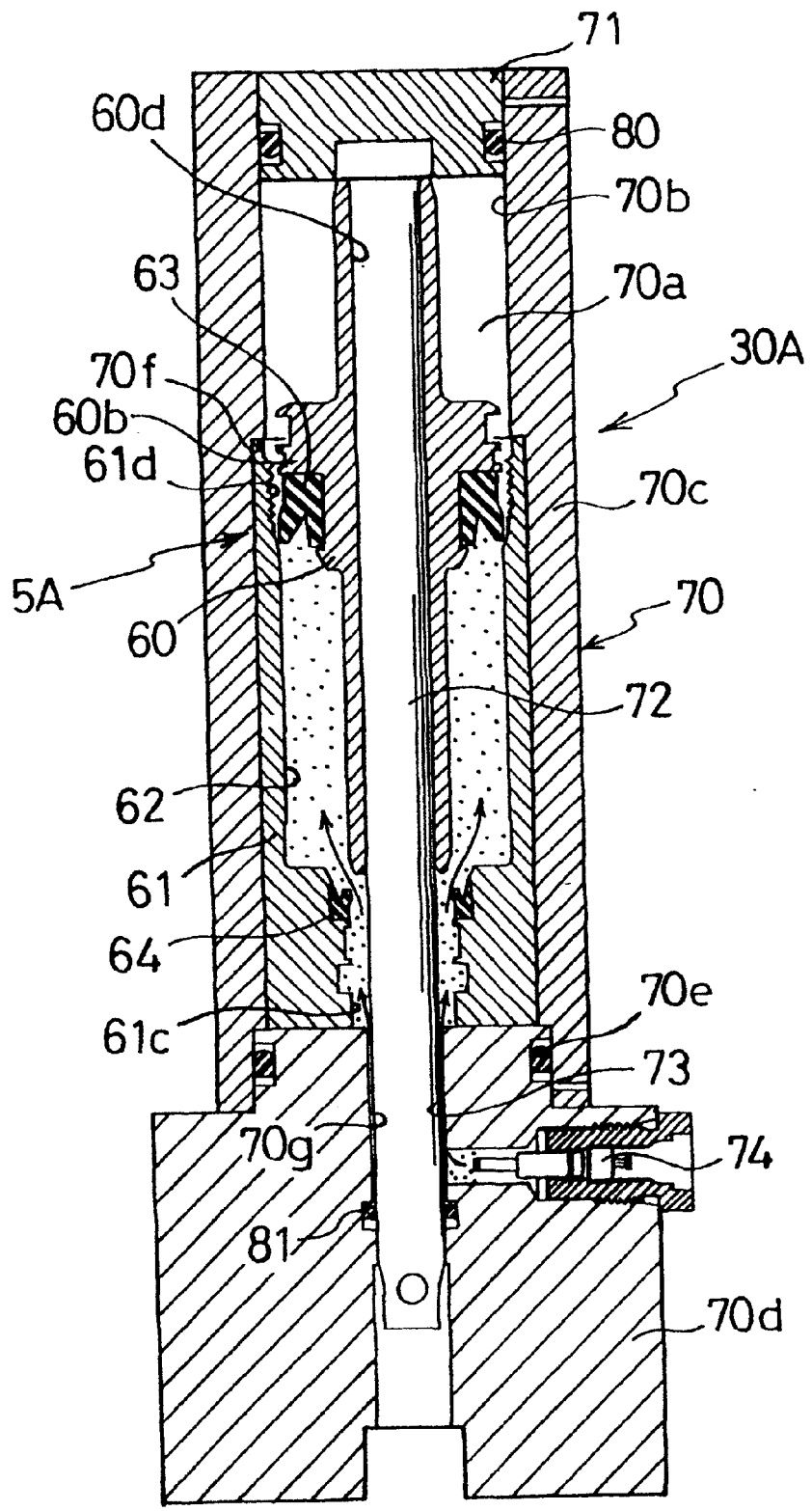
FIG. 9 is a longitudinal section drawing of the gas filling implement and gas spring during introduction of compressed gas.

Referring now to FIGS. 8 and 9, the following is a description of a method whereby a gas spring 5A is filled with compressed gas G. A gas filling implement 30A used during gas filling will first be described.

Gas filling implement 30A has a casing member 70 with an opening 70b in the top-end portion thereof. A housing chamber 70a airtightly accommodates gas spring 5A while rod member 60 is moved vertically (axially) in relation to cylinder main body 61. A blocking member 71 fits into opening 70b in an airtight and slidable manner, designed to be able to come into contact with rod member 60. A pull rod 72 is inserted into the axial center of gas spring 5A, designed such that the top end of the rod is immovably mounted on blocking member 71, and the bottom-end portion of the rod is airtightly inserted into casing member 70. A compressed gas filling conduit 73, formed in casing member 70, is used to fill housing chamber 70a with compressed gas G. A check valve 74 is incorporated into compressed gas filling conduit 73 of casing member 70.

Casing member 70 comprises a sleeve 70c, whose vertical length is significantly greater than that of gas spring 5A, and a closing block 70d for airtightly closing the bottom end of sleeve 70c through the agency of a sealing member 70e. Sleeve 70c and closing block 70d are designed as components that can be disassembled. When these components are disassembled, gas spring 5A is introduced without stopper member 65 through the bottom of sleeve 70c. The top-end portion of cylinder main body 61 is brought into engagement with an upper ledge 70f, somewhat above a middle portion on the internal periphery of sleeve 70c. Closing block 70d is then mounted, and gas spring 5A is immovably accommodated by housing chamber 70a of casing member 70.

Pull rod 72 is inserted into axial hole 60d of rod member 60 in an internally fitting fashion, and is thus passed through the entire gas spring 5A. Closing block 70d is provided with a vertically extended through hole 70g. The bottom portion of pull rod 72 in gas spring 5A is inserted unimpeded into through hole 70g. The space between through hole 70g and pull rod 72 forms part of compressed gas filling conduit 73.

Blocking member 71 is mounted by fitting it into opening 70b in an airtight and slidable manner through the use of a sealing member 80, fitted over blocking member 71. The bottom-end portion of pull rod 72 is airtightly inserted into casing member 70 through the use of a sealing member 81, mounted by being fitted into a wall portion formed by through hole 70g of closing block 70d. The bottom end of pull rod 72 extends below sealing member 81 when blocking member 71 is fitted into opening 70b and brought into contact with rod member 60. As a result, compressed gas filling conduit 73 and housing chamber 70a of casing member 70 are rendered airtight as a result.

When gas filling chamber 62 of gas spring 5A is filled with compressed gas G by employing gas filling implement 30A, stopper member 65 is first removed from cylinder main body 61 of gas spring 5A. Gas spring 5A is then placed into gas filling implement 30A, as shown in FIG. 8. In this state, compressed gas filling conduit 73 and housing chamber 70a of casing member 70 are rendered airtight in the above-described manner.

The restrictions imposed on rod member 60 (by stopper member 65) in terms of the range within which the member can move in relation to cylinder main body 61 are removed by not mounting stopper member 65. Introducing compressed gas G in this state via check valve 74 causes rod member 60 to move together, with blocking member 71 and pull rod 72, axially upward in relation to cylinder main body 61.

At this time, the pressure of compressed gas G introduced into compressed gas filling conduit 73 via check valve 74 acts on the bottom end face of rod member 60. Rod member 60 is pushed upward, and gas filling chamber 62 is then filled with compressed gas G via rod insertion hole 61c and compressed gas filling conduit 73 of gas filling implement 30A while rod member 60 is moved clear of rod insertion hole 61c, as shown by the arrows in FIG. 9.

In this case, rod member 60 is forcefully pushed upward because compressed gas G acts on piston portion 60b in a state in which gas filling chamber 62 contains only a small amount of compressed gas G. Rod member 60 is restricted in its upward movement by pull rod 72 and blocking member 71 before first sealing member 63 reaches threaded hole 61d of cylinder main body 61. Rod member 60 is thus caused to move axially upward in relation to cylinder main body 61 as long as first sealing member 63 has not yet reached threaded hole 61d. Gas filling chamber 62 can be filled with compressed gas G via the rod insertion hole 61c. First sealing member 63 is thereby prevented from being damaged as a result of contact with threaded hole 61d.

Rod member 60 is subsequently moved (together with pull rod 72 and blocking member 71) downward to its initial position in relation to the cylinder main body 61 by the downward pulling of pull rod 72. Gas filling chamber 62 is rendered airtight, sealing compressed gas G in gas filling chamber 62. Stopper member 65 is subsequently mounted, and gas spring 5A is then removed from gas filling implement 30A, completing the introduction of compressed gas G.

Gas filling chamber 62 of gas spring 5A is thus filled with compressed gas G in a simple and reliable manner by the use of gas filling implement 30A, even when gas spring 5A lacks the commonly mounted gas filling valve. The same actions and effects as those achieved by the above-described main embodiment can therefore be obtained.

While the present invention is not limited thereby, modifications of the above embodiments will now be described.

1) The above-described main embodiment can also be implemented using a control mechanism whereby the pressure of compressed gas G is exerted when gas spring 5 is placed in gas filling implement 30. Gas filling chamber 22 is filled with compressed gas G such that blocking member 33 or outer cylinder 32 is restricted together with rod member 20 in its ability to move above the position occupied during gas introduction. The control mechanism can be constructed by providing special linkage among inner cylinder 31, outer cylinder 32, blocking member 33, and axial hole blocking member 34 of gas filling implement 30.

2) The above-described main embodiment can also be implemented by fashioning three or more pin members 25 and providing cylinder main body 21 with three or more slots 26 and threaded holes 20e in association with these pin members. Pin members 25, slots 26, and threaded holes 20e are disposed symmetrically about the axial center of rod member 20.

3) The other embodiment may also be configured such that the filling of gas filling chamber 62 with compressed gas G via rod insertion hole 61c is supplemented by an arrangement in which compressed gas G introduced to housing chamber 70a above cylinder main body 61 is subsequently admitted by gas filling chamber 62 through the gap between cylinder main body 61 and rod member 60, with or without the elastic deformation of first sealing member 63. In this case, the gas can be introduced unimpeded when first sealing member 63 reaches threaded hole 61d.

The main embodiment and the other embodiment can be modified in a variety of ways as long as the essence of the present invention is not compromised, and the present invention can be adapted not only to devices for fastening tools to main shafts, but also to various other mechanisms and devices required to perform drive functions.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gas spring, comprising:
   a cylindrical rod member having a piston;
   a cylinder main body fitted over said rod member;
   an annular gas filling chamber, filled with compressed gas, disposed between said rod member and said cylinder main body;
   a first sealing member fitted over said piston of said rod member at one end of the gas filling chamber;
   a second sealing member fitted into said cylinder main body at the other end of said gas filling chamber;
   a plurality of pin members disposed in an axially symmetrical fashion about said rod member;
   a plurality of slots provided in said cylinder main body; and
   said plurality of slots aligning with said plurality of pin members to restrict a range of movement of said rod member in relation to said cylinder main body.

2. The gas spring according to claim 1, wherein:
   when said plurality of pin members are unmounted from said plurality of slots, said cylinder main body is moved axially in relation to said rod member while said second sealing member is prevented from separating from said rod member;
   said gas filling chamber communicates with said plurality of slots, such that said gas filling chamber may be filled with compressed gas through said plurality of slots; and
   said cylinder main body is moved back in relation to said rod member to align said plurality of slots with said plurality of pin members.

3. A gas spring, comprising:
   a cylindrical rod member having a piston;
   a cylinder main body fitted over said rod member;
   an annular gas filling chamber, filled with compressed gas, disposed between said rod member and said cylinder main body;
   a first sealing member fitted over said rod member at one end of said gas filling chamber;
   a second sealing member fitted into said cylinder main body at the other end of said gas filling chamber;
   a stopper member, internally fitted and threadably engaged with said cylinder main body, slidably fitted over said rod member on a side opposite from said gas filling chamber in relation to said piston of said cylindrical rod member.

4. The gas spring according to claim 3, wherein:
   when said stopper member is not yet mounted, said rod member is moved axially in relation to said cylinder main body while said first sealing member is prevented from reaching a threaded hole for said stopper member of said cylinder main body;
   a rod insertion hole, facing said second sealing member, communicates with said gas filling chamber such that compressed gas is filled therein through said rod insertion hole; and
   said rod member is then moved back, to allow mounting of said stopper member.

5. A gas filling method for introducing compressed gas into a gas spring, said gas spring comprising:
   a cylindrical rod member having a piston;
   a cylinder main body fitted over said rod member;
   an annular gas filling chamber, filled with compressed gas, disposed between said rod member and said cylinder main body;
   a first sealing member fitted over said piston of said cylindrical rod member at one end of said gas filling chamber;
   a second sealing member fitted into said cylinder main body at the other end of said gas filling chamber;
   a plurality of pin members disposed in an axially symmetrical fashion about said rod member;
   a plurality of slots provided in the cylinder main body; and
   said plurality of slots aligning with said plurality of pin members to restrict a range of movement of said rod member in relation to said cylinder main body;
   said gas filling method comprising:
      placing said gas spring in a special gas filling implement in a state in which said plurality of pin members are not yet mounted with said plurality of slots;
      moving said cylinder main body axially in relation to said rod member while said second sealing member is prevented from separating from said rod member;
      filling said gas filling chamber with compressed gas through said gas filling implement and at least one of said plurality of slots;
      moving said cylinder main body back in relation to said rod member; and
      locking said plurality of pin members in place.

6. The gas filling method for a gas spring as defined in claim 5, wherein said special implement comprises:
- an inner cylinder airtightly fittable over a slot-free portion of said cylinder main body;
- an outer cylinder, extending all the way to one end of said inner cylinder, slidably fitting over said inner cylinder in an airtight fashion;
- a blocking member, configured to block one end of said rod member and to airtightly fit into an end portion of said outer cylinder;
- an axial hole blocking member, airtightly inserted into said axial hole of said rod member on the opposite side from said blocking member; and
- a compressed gas filling conduit formed in said axial hole blocking member.

7. A gas filling method for introducing compressed gas into a gas spring, said gas spring comprising:
- a cylindrical rod member having a piston;
- a cylinder main body fitted over said rod member;
- an annular gas filling chamber, filled with compressed gas, disposed between said rod member and said cylinder main body;
- a first sealing member fitted over said rod member at one end of said gas filling chamber;
- a second sealing member fitted into said cylinder main body at the other end of said gas filling chamber;
- a stopper member, internally fitted and threadably engaged with said cylinder main body, slidably fitted over said rod member on a side opposite from said gas filling chamber in relation to said piston of said cylindrical rod member; said gas filling method comprising:
- placing said gas spring in a special gas filling implement in a state in which said stopper member is not yet mounted;
- moving said rod member axially in relation to said cylinder main body while said first sealing member is prevented from reaching a threaded hole for said stopper member of said cylinder main body;
- filling said gas filling chamber with compressed gas through said gas filling implement and a rod insertion hole facing said second sealing member;
- moving said rod member back in relation to said cylinder main body; and
- mounting said stopper member.

8. The gas filling method for a gas spring as defined in claim 7, wherein said special gas filling implement comprises:
- a casing member having an opening on one end of said stopper member side and possessing a housing chamber in which said gas spring is airtightly accommodated while said rod member is moved axially in relation to said cylinder main body;
- a blocking member, fitted into said opening in an airtight and slidable manner, designed to contact said rod member;
- a pull rod, inserted into an axial center of said gas spring, designed such that one end thereof is immovably mounted on said blocking member, and the other end thereof is airtightly inserted into said casing member; and
- a gas filling conduit, formed in said casing member, used to fill said housing chamber with compressed gas.

* * * * *